United States Patent
Reddehase et al.

(10) Patent No.: US 10,844,900 B2
(45) Date of Patent: Nov. 24, 2020

(54) RADIAL BALL JOINT FOR A VEHICLE

(71) Applicant: ZF Friedrichshafen AG, Friedrichshafen (DE)

(72) Inventors: Günter Reddehase, Brockum (DE); Uwe Petersen, Espelkamp (DE); Dirk Sokolihs, Porta Westfalica (DE); Frank Hensel, Pr. Oldendorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 323 days.

(21) Appl. No.: 15/754,668

(22) PCT Filed: Sep. 26, 2016

(86) PCT No.: PCT/EP2016/072791
§ 371 (c)(1),
(2) Date: Feb. 23, 2018

(87) PCT Pub. No.: WO2017/071894
PCT Pub. Date: May 4, 2017

(65) Prior Publication Data
US 2018/0258983 A1    Sep. 13, 2018

(30) Foreign Application Priority Data

Oct. 28, 2015    (DE) .......... 10 2015 221 046

(51) Int. Cl.
*F16C 11/06*    (2006.01)
*F16C 11/08*    (2006.01)

(52) U.S. Cl.
CPC ........ *F16C 11/068* (2013.01); *F16C 11/0628* (2013.01); *F16C 11/086* (2013.01);
(Continued)

(58) Field of Classification Search
CPC .............. F16C 11/0628; F16C 11/0642; F16C 11/0647; F16C 11/0652; F16C 11/0666;
(Continued)

(56) References Cited

U.S. PATENT DOCUMENTS 3,451,701 A * 6/1969 Smith ................. F16C 11/0638
403/140
3,530,495 A * 9/1970 Kindel ................ F16C 11/0638
403/140
(Continued)

FOREIGN PATENT DOCUMENTS

DE        582 421          8/1933
DE        1085775 B  *   7/1960 .......... F16C 11/0638
(Continued)

OTHER PUBLICATIONS

German Search Report Corresponding to 10 2015 221 046.4 dated Feb. 26, 2016.
(Continued)

*Primary Examiner* — Josh Skroupa
(74) *Attorney, Agent, or Firm* — Davis & Bujold PLLC; Michael J. Bujold

(57) ABSTRACT

A radial ball joint (1, 50, 70) for a vehicle having a housing (2, 51) for holding a joint ball (11) of a ball stud (6) so that the ball stud can rotate and pivot. An upper bearing shell (7), made from a steel sheet, is arranged between an inside wall (10) of the housing (2, 51) and the joint ball (11). The upper bearing shell (7) is in contact with the joint ball (11) over a contact zone (21) to provide the joint ball (11) with a circumferential slide bearing between its equator (12) and its upper pole (13). The upper bearing shell (7) is in the form of an annular, circumferentially closed drawn component and has in the contact zone (21) with the joint ball (11). A
(Continued)

number of lubrication grooves (14), pass through a wall (20) of the upper bearing shell (7), in an embossment manner.

20 Claims, 5 Drawing Sheets

(52) U.S. Cl.
CPC ....... *F16C 11/0647* (2013.01); *F16C 11/0652* (2013.01); *F16C 11/0671* (2013.01); *F16C 11/0685* (2013.01); *Y10T 403/32737* (2015.01)

(58) Field of Classification Search
CPC . F16C 11/0671; F16C 11/068; F16C 11/0685; F16C 11/086; Y10T 403/32631; Y10T 403/32713; Y10T 403/32729; Y10T 403/32737
USPC ................................. 403/122, 132, 134, 135
See application file for complete search history.

(56) References Cited

U.S. PATENT DOCUMENTS

| | | | | |
|---|---|---|---|---|
| 4,358,211 A | * | 11/1982 | Goodrich, Jr. | F16C 11/086 403/132 |
| 4,577,989 A | * | 3/1986 | Ito | F16C 11/0638 403/135 |
| 4,875,794 A | * | 10/1989 | Kern, Jr. | F16C 11/086 403/132 |
| 5,286,131 A | * | 2/1994 | Wood | F16C 11/0647 403/132 |
| 5,772,337 A | * | 6/1998 | Maughan | F16C 11/0638 403/137 |
| 7,661,902 B2 | | 2/2010 | Brunneke | |
| 9,518,602 B2 | * | 12/2016 | Forthaus | F16C 11/0638 |
| 2009/0232589 A1 | | 9/2009 | Kuru | |

FOREIGN PATENT DOCUMENTS

| | | | | |
|---|---|---|---|---|
| DE | 27 21 159 A1 | | 11/1978 | |
| DE | 3821146 A1 | * | 12/1989 | .......... F16C 11/0671 |
| DE | 295 07 245 U1 | | 8/1995 | |
| DE | 19513826 C1 | * | 7/1996 | .......... F16C 11/0642 |
| DE | 103 61 289 A1 | | 7/2005 | |
| DE | 10 2005 030 747 A1 | | 1/2007 | |
| DE | 10 2008 017 953 A1 | | 11/2008 | |
| EP | 1 270 969 A2 | | 1/2003 | |
| FR | 2 560 140 A1 | | 8/1985 | |
| WO | WO-2010121610 A1 | * | 10/2010 | .......... F16C 11/0628 |

OTHER PUBLICATIONS

International Search Report Corresponding to PCT/EP2016/072791 dated Dec. 22, 2016.
Written Opinion Corresponding to PCT/EP2016/072791 dated Dec. 22, 2016.

\* cited by examiner

RADIAL BALL JOINT FOR A VEHICLE

This application is a National Stage completion of PCT/EP2016/072791 filed Sep. 26, 2016, which claims priority from German patent application serial no. 10 2015 221 046.4 filed Oct. 28, 2015.

FIELD OF THE INVENTION

The invention concerns a radial ball joint for a vehicle.

BACKGROUND OF THE INVENTION

Radial ball joints for vehicles, for example for steering links of utility vehicles, are known from the prior art and comprise a housing for receiving a joint ball of a ball stud in such a manner that it can rotate and pivot. The central axis of the undeflected ball stud extends in the axial direction of the radial ball joint, which is designed for loads perpendicular to the axial direction, i.e. in the radial direction. Radial ball joints often have a shaft which is made integrally with the housing and extends away from it at least substantially perpendicularly to the axial direction, the shaft being provided for example for connecting to a steering rod or a track rod of a utility vehicle. Radial ball joints are often referred to as angular ball joints or simply angle joints.

DE 27 21 159 A1 discloses a radial ball joint with a housing that is open on two sides, and in which one of the two housing openings is closed off by a cover inset into the housing and flanged thereto. Out of the other housing opening there extends a stud which is made integrally with the joint ball and forms the ball stud together with it. Between an inside wall of the housing and the joint ball, and in contact with the joint ball, there is arranged an upper bearing shell made of steel which forms a circumferential slide bearing for the joint ball between its equator and its upper pole. The upper bearing shell covers the joint ball in an area that corresponds to the surface of a spherical layer, also known as the spherical zone, which corresponds with a perpendicular centerline extending in the axial direction of the radial ball joint. Before closing such radial ball joints their housing is as a rule filled with lubricant, which during driving operation should be distributed over the surface of the joint ball due to the deflection and rotational movements of the ball stud.

SUMMARY OF THE INVENTION

The purpose of the present invention is to provide a better lubricant supply in the contact area between the upper bearing shell and the joint ball.

According to the present invention this objective is achieved by a radial ball joint of the type which also embodies the characterizing features specified in the independent claim.

Preferred embodiments and further developments are the object of the subordinate claims.

Accordingly the invention envisions a radial ball joint for a vehicle, such that the radial ball joint comprises a housing for receiving a joint ball of a ball stud in such manner that it can rotate and pivot. Between an inside wall of the housing and the joint ball, and in contact with the joint ball over a contact zone, there is arranged an upper bearing shell made of steel which forms a circumferential slide bearing for the joint ball between its equator and its upper pole. According to the invention, the upper bearing shell is in the form of an annular, circumferentially closed drawn component having a plurality of lubrication grooves in the contact zone with the joint ball, which grooves pass through a wall of the upper bearing shell in the manner of an embossment.

By virtue of the lubrication grooves in the contact zone of the upper bearing shell with the joint ball, effective lubricant supply is provided. The lubrication grooves on the one hand enable the lubricant to be transported within the radial ball joint and on the other hand ensure lubricant supply to the aforesaid contact zone. By virtue of rotational and pivoting movements of the ball stud relative to the upper bearing shell, a uniform distribution of the preferably grease-like lubricant in the contact zone with the joint ball is achieved.

The upper bearing shell is in particular made of deformable steel sheet with good drawing properties and has substantially the same wall thickness at all points, although by the nature of the process some regions which were stretched more during the drawing process may have a slightly smaller wall thickness compared with the starting material. In the context of the invention a drawn component is understood to mean that a stamped component is brought at least essentially to its final component geometry by a drawing process. In contrast to the familiar deep-drawing process, in which a so-termed blankholder, also called a sheet holder or a drawing ring, is used, in the production of the drawn component in this case no further trimming of the component circumference is needed after the drawing process in order to produce the final component geometry. Accordingly, the final component geometry of the upper bearing shell has cut edges which were formed during the production of the stamped component.

As viewed in the axial direction of the radial ball joint, the equator of the joint ball is the circumferential line of the ball joint with the largest diameter. The centerline of the circular area enclosed by that circumference line coincides with the central axis of the ball stud and theoretically passes through the surface of the joint ball at its upper pole. Since in the area of its upper pole the joint ball is preferably flattened, in this case the upper pole lies outside the actual surface of the joint ball. In contrast to bearing shells known from the prior art which are slotted in the axial direction, the upper bearing shell is circumferentially closed.

Preferably, the plurality of lubrication grooves that pass through the wall of the upper bearing shell occur on the side of the upper bearing shell facing away from the contact zone with the joint ball in the form of bulges. The lubrication grooves, which are produced in an embossing process that comes after the drawing process, pass through the wall of the upper bearing shell without actually penetrating by cutting through it. Consequently the upper bearing shell has a closed circumferential surface. During the embossing, in the area of the lubrication grooves the material of the wall is pushed outward essentially perpendicularly to the contact zone over which the upper bearing shell rests against the joint ball. This is what produces the bulges on the surface of the upper bearing shell facing away from the contact zone with the joint ball.

Advantageously, the lubrication grooves extend in a plane passing through the central axis of the ball stud. Specifically, the upper bearing shell has four lubrication grooves distributed around the circumference of the contact zone with the joint ball. The extension of the lubrication grooves in a plane passing through the central axis of the ball stud ensures lubricant transport in the axial direction of the radial ball joint.

In an advantageous further development of the invention, the upper bearing shell is made of case-hardened steel and its surface is case-hardened all over. With regard to the relative movements between the upper bearing shell and the joint ball, the case-hardened surface of the upper bearing shell results in high wear resistance during driving operation. Since by the nature of the process the sheet of the upper bearing shell made of case-hardened steel remains soft in its core even after the case-hardening, the upper bearing shell retains a certain elasticity and can therefore fit snugly against the surface of the joint ball. Moreover, the soft core prevents fracturing of the upper bearing shell when it is impact-loaded, as can happen when driving over a pothole. The hardening depth achievable during case-hardening is larger than with other surface hardening methods such as the hardening depth produced by nitriding. Even with high loads, this prevents pressing of the case-hardened surface layer into the comparatively softer core material of the upper bearing shell. It is preferable for the surface of the joint ball as well to be surface-hardened, in particular induction hardened. Such an arrangement results in lubricated sliding friction between hard surfaces, with the advantage of low friction at the same time as high wear protection.

Preferably an end face of the upper bearing shell, together with a corresponding stop surface of a cover closing the housing on one side, forms an end-stop for movement of the joint ball in the axial direction. Due to the possibility of the joint ball's axial movement within the housing, undesired effects of impact loads on the radial ball joint can be kept small.

For example, bumps transmitted from the road to the steering wheel of a utility vehicle can be softened when, on the way from the road to the steering wheel, the bumps pass by way of a steering rod with a radial ball joint that allows axial movement. Thanks to the annular and circumferentially closed structure of the upper bearing shell, the shell has high rigidity in the axial direction of the radial ball joint. Furthermore, the lubrication grooves of the upper bearing shell also act as stiffening ribs. The cover, which is preferably contoured and flanged with the housing all around its edge, is also particularly suitable as an end-stop due to its stability. The end face of the upper bearing shell facing toward the upper pole of the joint ball and the corresponding stop surface of the cover facing toward the joint ball are advantageously orientated at least substantially perpendicularly to the axial direction of the radial ball joint.

According to an advantageous further development, the upper bearing shell is arranged radially a distance away from the inside wall of the housing. This results in unimpeded mobility of the upper bearing shell in the axial direction of the radial ball joint.

Advantageously, a round sealing ring is arranged between the upper bearing shell, the inside wall of the housing and the cover, in contact all around with each of them, and by means of the round sealing ring the upper bearing shell is braced in the axial direction against the joint ball. Using compressed round sealing rings to produce a bracing force is better than the use of spiral springs or cup springs known from the prior art. In particular the round sealing ring, also called an O-ring, has standard dimensions and is made from an elastomer material with a Shore hardness for example of 85 to 90. The bracing prevents the aforesaid components, due to vibrations that occur during driving operation because of the axial mobility, from colliding against one another in an uncontrolled manner, which would result in unwanted rattling noises. Furthermore, by virtue of the braced round sealing ring, axial movements of the joint ball toward the cover are damped. In the arrangement described above, the round sealing ring can be compressed only so far until the front end of the upper bearing shell facing toward the upper pole makes contact with the inside of the cover facing toward the joint ball.

Preferably, the bulges act to prevent rotation and any twisting of the upper bearing shell relative to the round sealing ring, or at least do so to a large extent. In this way, when the ball stud rotates or pivots there is only relative movement between the upper bearing shell and the joint ball. Moreover, the upper bearing shell and the round sealing ring do not rotate relative to the housing and the cover. Since the round sealing ring does not move relative to the components with which it is in contact, the round sealing ring is subjected to practically no abrasion. Because of this, and thanks to the above-described end-stop which prevents excessive and damaging overcompression of the ring, the round sealing ring has a long useful life.

In an advantageous further development of the invention, between the inside wall of the housing and the joint ball there is a lower bearing shell made of steel sheet, which is in contact with them over contact zones in order to provide all-round sliding support for the joint ball essentially between its equator and a stud connected to the joint ball. Thanks to the contact zones of the lower bearing shell, which rest on the one hand against the inside wall of the housing and on the other hand against the joint ball, force transmission over a substantial area is ensured between the joint ball and the housing. Thus, load peaks caused by point or line contact are avoided. The stud can be made integrally with the joint ball. The stud can also be a separate component, connected to the joint ball for example by a press fit. In the latter case one speaks of an assembled ball stud. The stud and the ball together form the ball stud. In particular, like the upper bearing shell so too the lower bearing shell is made of case-hardened steel, hardened all over its surface.

Expediently, the lower bearing shell is made as an annular, circumferentially closed drawn component and has in the contact zone with the joint ball a plurality of lubrication grooves that extend in a plane passing through the central axis of the ball stud. In combination with the arrangement of lubrication grooves in the upper bearing shell, in this way an all-around lubricant supply of the joint ball and the two bearing shells in contact with it is ensured. In particular, like the upper bearing shell the lower bearing shell also has four lubrication grooves distributed uniformly around the circumference of the contact zone.

Advantageously, in its contact zone with the inside wall of the housing the lower bearing shell is at least in sections in the form of a spherical outer surface continuous in the circumferential direction. In this context a continuous spherical outer surface means that in contrast to the lubrication grooves of the upper bearing shell, the lubrication grooves of the lower bearing shell do not pass through the wall of the lower bearing shell and so interrupt the circumferentially continuous shape of the contact zone with the inside wall of the housing. In particular, the contact zone of the lower bearing shell against the inside wall of the housing rests against the entire surface of the inside wall of the housing. Since the contact zone is not penetrated by lubrication grooves, the inside wall of the preferably cast or forged housing can be finished relatively simply by machining. If analogously to the upper bearing shell the contact zone were to have bulges, free spaces would have to be provided in the inside wall of the housing to accommodate those bulges. This would make the finishing of the inside wall of the housing in the contact zone more expensive and would reduce the area available for transmitting force from the lower bearing shell to the housing, which would result in a higher surface pressure in the contact zone.

According to a further development of the invention, the lubrication grooves are formed in a wall of the lower bearing shell without machining, in the manner of an embossment. Compared with lubrication grooves produced by machining, ones produced without machining by embossing have the advantage that the material fibers are not cut through by the machining. Consequently, bearing shells with embossed lubrication grooves are more durable. Furthermore, the embossing of the lubrication grooves is cheaper than, for example, producing them by milling.

Preferably, the lower bearing shell extends in the direction toward the upper pole of the joint ball to beyond the equator of the joint ball. Due to the previously described mobility of the ball stud in the axial direction, during driving operation the joint ball can move clear of its bearing seat in the lower bearing shell and be displaced axially toward the cover. The extension of the lower bearing shell in the direction of the upper pole of the joint ball is necessary so that in this condition also the bearing forces, which act predominantly perpendicularly to the axial direction, can be absorbed by the lower bearing shell. In particular the section of the lower bearing shell that extends axially beyond the equator in the direction toward the upper pole is in the form of a hollow cylinder, in order to provide a passage through which the joint ball can be inserted into the lower bearing shell during the course of assembly. Advantageously, an end face of the lower bearing shell facing toward the upper pole of the joint ball is machined in order to remove part of the drawn component which, by the nature of the process, cannot be used. Thus, the end face can have traces left by the machining operation, in particular concentrically arranged machining grooves that result from a turning operation.

In an advantageous embodiment of the invention the radial ball joint has once-through lubrication with a lubricant inlet via a lubrication nipple and lubricant outlet via one or more outlet openings in a sealing bellows that extends between the housing and the ball stud and seals the radial ball joint. In the context of the invention once-through lubrication is understood to mean that the bearing points between the joint ball and the upper and lower bearing shells are always supplied with fresh lubricant, in particular lubricating grease, whereas used lubricant passes out of the outlet openings. The lubricant is for example pressed into the lubrication nipple by a grease gun and the incoming lubricant pushes the lubricant already in the radial bearing in the direction of the sealing bellows.

Advantageously, the lubrication nipple is arranged in the cover centrally, extending in the axial direction, or at the side of the housing, and when the lubrication nipple is arranged at the side, the lower bearing shell has an opening in the area of at least one lubrication groove in order to allow the lubricant to enter. The position of the lubrication nipple can be chosen depending on the available fitting space at the fitting location.

According to an alternative embodiment of the invention, the radial ball joint is designed to be maintenance-free. The maintenance-free radial ball joint is filled just once during assembly with an amount of grease deemed sufficient for the expected service life. Accordingly, with the radial ball joint designed to be maintenance-free there is no need to top up the lubricant. From the outside, the maintenance-free radial ball joint can be recognized by the fact that it has no lubrication nipple or similar lubricant supply means.

The radial ball joint described can advantageously be used on a two-point link in the form of a track rod, a stabilizer tie-rod, an actuator rod or a Panhard rod.

BRIEF DESCRIPTION OF THE DRAWINGS

Below, the invention is explained in more detail with reference to drawings intended to represent only example embodiments, wherein the same indexes refer to the same components or elements. The drawings show.

DETAILED DESCRIPTION OF THE PREFERRED EMBODIMENTS

Figure 1:
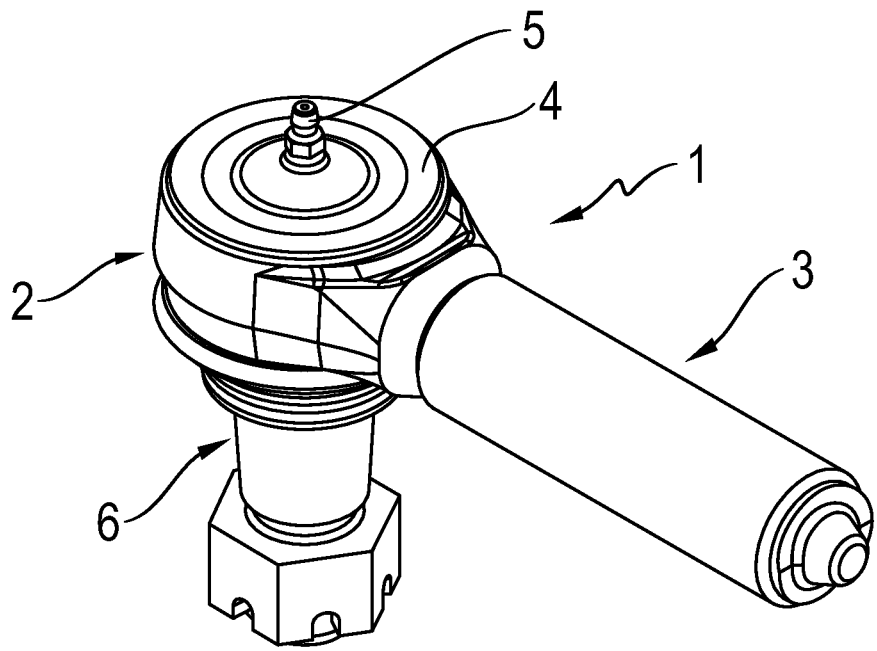
FIG. 1: Perspective representation of a radial ball joint according to a first embodiment of the invention.

FIG. 1 shows a radial ball joint 1, which comprises a housing 2 and a shaft 3 made integrally therewith for connecting the radial ball joint to another vehicle component such as a steering rod or a track rod. The housing 2 has two housing openings, the first of which is closed by a flanged cover 4. At the center of the circular cover 4 is fitted a lubrication nipple 5 for supplying the radial ball joint 1 with lubricant. A ball stud 6 extends out of the second housing opening, which is arranged opposite the first housing opening.

Figure 2:
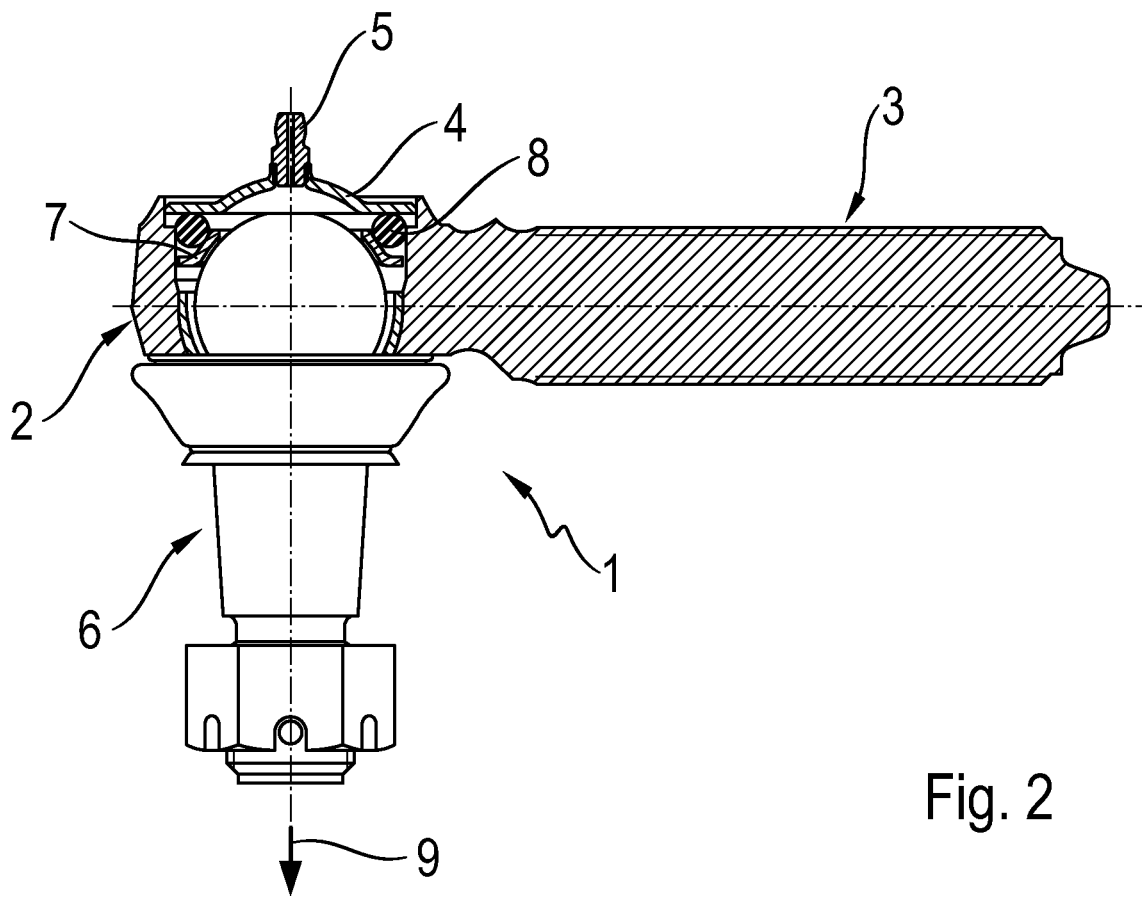
FIG. 2: A partially sectioned representation of the radial ball joint of FIG. 1, in a preassembled condition.

In FIG. 2 a round sealing ring 8 can be seen between the cover 4 and an upper bearing shell 7, which is not compressed and in this condition has a circular cross-section. The ball stud 6 is not deflected and extends in the axial direction 9 of the radial ball joint 1. The cover 4 is designed for crimping to the housing 2, but still has to be displaced in the axial direction 9 of the radial ball joint 1 as far as a stop on the housing 2 in order to reach its fitted position. Due to the displacement of the cover 4 to its fitted position the round sealing ring 8, also called an O-ring, is compressed. During the crimping a circumferential beaded rim of the housing 2 is positioned over the edge of the cover 4.

Figure 3:
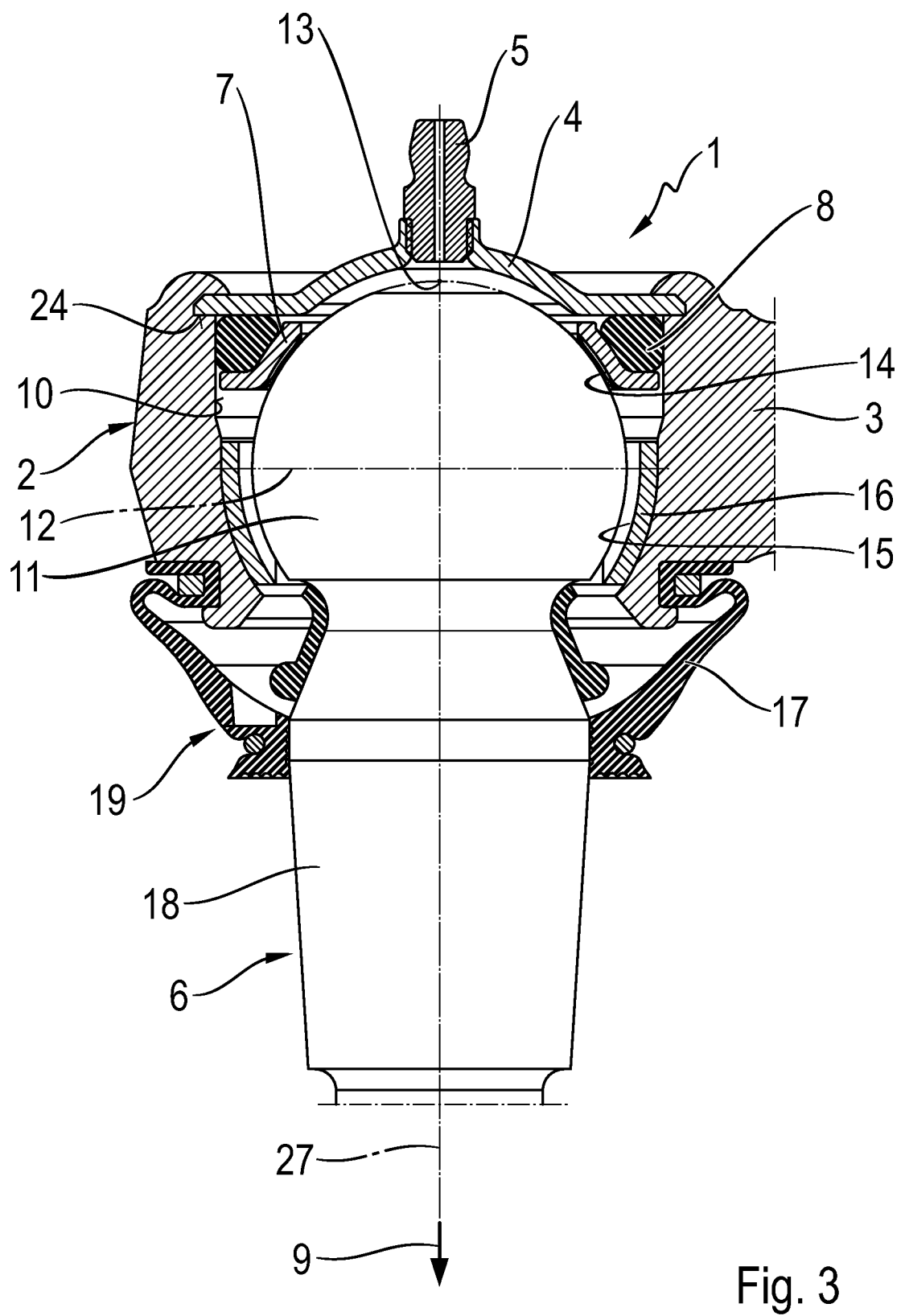
FIG. 3: A sectioned view of part of the radial ball joint of FIG. 2 in a ready-assembled condition.

The cover 4 crimped to the housing 2 and the compressed round sealing ring 8 between the cover 4 and the upper bearing shell 7 can be seen in FIG. 3. Between an inside wall 10 of the housing 2 and a joint ball 11 fitted and able to rotate and pivot in the housing 2, the upper bearing shell 7 is arranged in contact with the joint ball 11 to provide a circumferential slide bearing for the joint ball 11 between its equator 12 and its upper pole 13. The upper bearing shell 7, which is made of case-hardened steel and is case-hardened all over its surface, covers the joint ball 11 in an area that corresponds to the surface of a spherical layer with a centerline extending in the axial direction 9 of the radial ball joint 1. As viewed in the axial direction 9, the equator 12 is the circumferential line of the joint ball 11 having the largest diameter. The centerline of the spherical surface enclosed by the circumferential line coincides with the central axis 27 of the ball stud 6 and passes through the surface of the joint ball 11 theoretically at the upper pole 13. Since in the area of an upper pole 13 the joint ball 11 is flattened, the upper pole 13 is not located in the actual surface of the joint ball 11.

Lubricant, in particular lubricating grease injected into the housing 2 through the lubrication nipple 5, is pressed along the surface of the joint ball 1 in the axial direction 9 first through lubrication grooves 14 in the upper bearing shell 7 and then through lubrication grooves 15 of a lower bearing shell 16. Both the lubrication grooves 14 of the upper bearing shell 7 and the lubrication grooves 15 of the lower bearing shell 16 extend in a plane passing through the central axis 27 of the ball stud 6. When more lubricant is added, the lubricant injected to begin with collects in a sealing bellows 17. The sealing bellows 17 seals the radial ball joint 1 and extends between the housing 2 and the stud 18, which is formed integrally with the joint ball 11 and together with it forms the ball stud 6. When the sealing bellows 17 is full of lubricant, excess lubricant can escape through three outlet openings 19 distributed uniformly around the circumference of the sealing bellows. The above-described method of supplying lubricant is called once-though lubrication and ensures that the bearing points between the joint ball 11 and the upper 7 and lower 16 bearing shells are supplied with fresh lubricating grease and that contaminated lubrication grease is expelled through the outlet openings 19.

Figure 4:
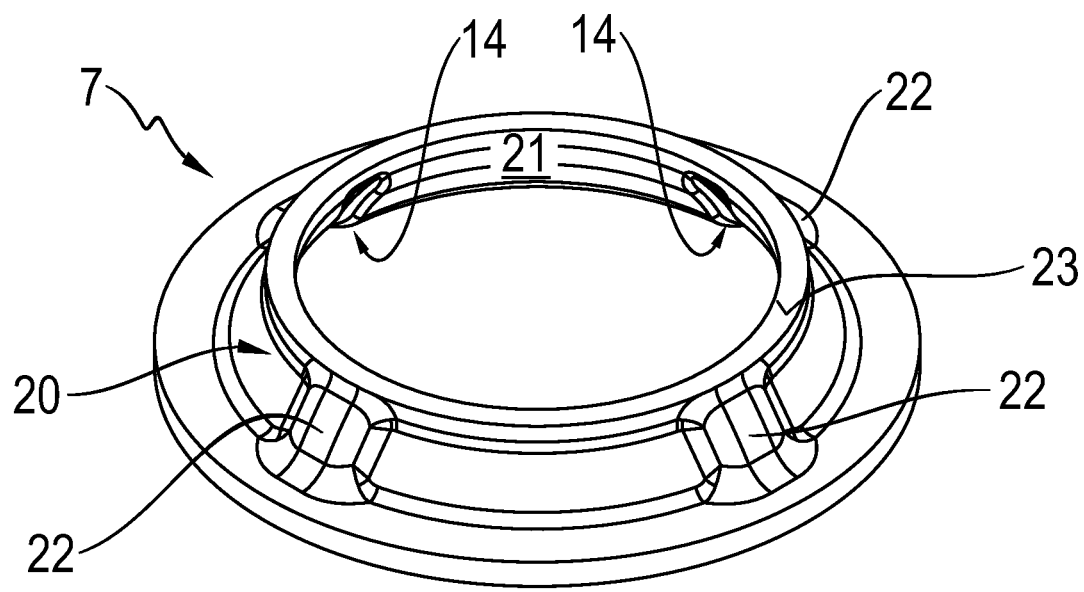
FIG. 4: Perspective representation of an upper bearing shell of the radial ball joint according to the first embodiment.

FIG. 4 shows four lubrication grooves 14 that pass though a wall 20 of the upper bearing shell 7 in the manner of an embossment, and extend in a plane passing through the central axis 27 of the ball stud 6. The lubrication grooves 14 are formed in a contact zone 21 of the upper bearing shell 7 against the joint ball 11 and each of them has a groove base surface that extends at least essentially parallel to the surface of the joint ball 11. The four lubrication grooves 14 passing through the wall 20 protrude as bulges 22 on the surface area of the upper bearing shell 7 facing away from the contact zone 21 with the joint ball 11. The lubrication grooves 14, which are formed by an embossing process, extend through the wall 20 of the upper bearing shell 7 without actually penetrating through it. Consequently the upper bearing shell 7 has a closed circumferential surface. By the embossing process, in the area of the lubrication grooves 14 the material of the wall 20 is displaced essentially perpendicularly to the contact zone 21 over which the upper bearing shell 7 rests against the joint ball 11. This is what produces the bulges 22 on the surface area of the upper bearing shell 7 facing away from the contact zone 21 against the joint ball 7.

In the assembled condition of the radial ball joint 1, the bulges 22 press into the round sealing ring 8 and deform it elastically. In that way, during driving operation rotation of the round sealing ring 8 relative to the upper bearing shell 7 is at least substantially prevented. An end face of the upper bearing shell 7 facing toward the upper pole 13 of the joint ball 11, together with a corresponding stop surface 24 of the cover 4, form an end stop for the movement of the joint ball 11 in the axial direction 9 of the radial ball joint 1. The cover 4 has a contoured shape and at its edge is crimped circumferentially with the housing 2. The end face 23 of the upper bearing shell 7 and the corresponding stop surface 24 of the cover 4 facing toward the joint ball 11 are advantageously orientated at least essentially perpendicularly to the axial direction 9 of the radial ball joint 1.

Figure 5:
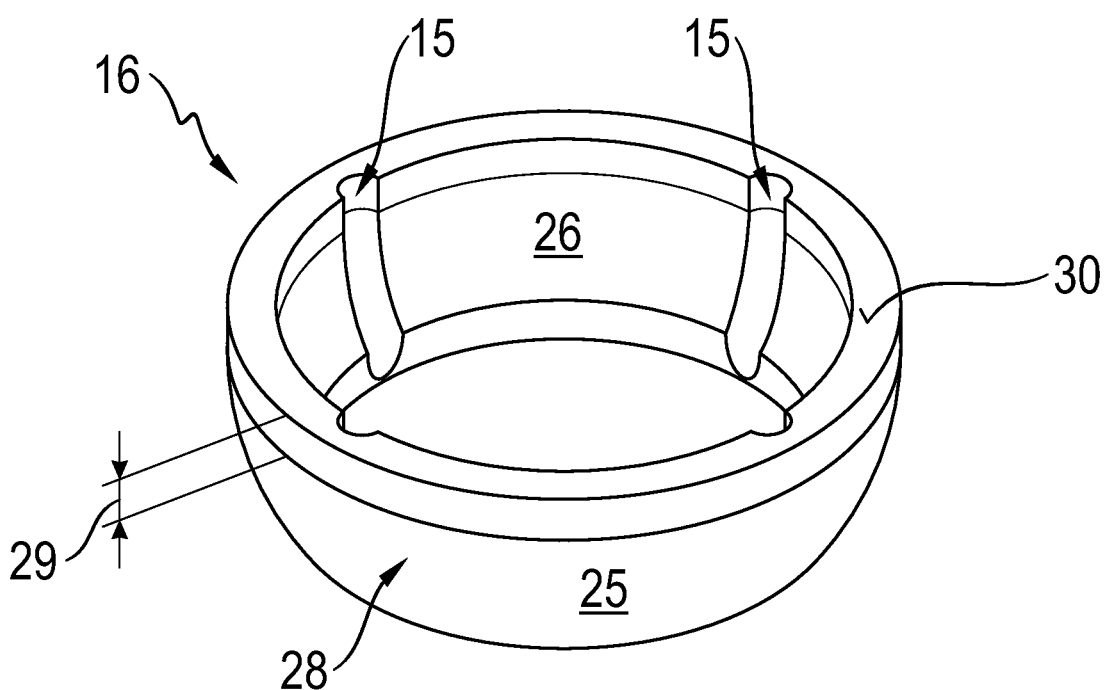
FIG. 5: Perspective view of a lower bearing shell of the radial ball joint according to the first embodiment.

FIG. 5 shows the lower bearing shell 16 arranged between the inside wall 10 of the housing 2 and the joint ball 11 and in contact with each of them over respective contact zones 25, 26. Like the upper bearing shell 7, the lower bearing shell 16 is made of steel sheet case-hardened all over its surface and serves to form a circumferential slide bearing for the joint ball 11 essentially between its equator 12 and the stud 18 formed integrally with the joint ball 11. The contact zones 25, 26 of the lower bearing shell 16, which rest on the one hand against the inside wall 10 of the housing 2 and on the other hand against the joint ball 11, ensure force transmission over a substantial area from the joint ball 11 into the housing 2. In the contact zone 25 with the inside wall 10 of the housing 2, the lower bearing shell 16 is formed between its underside and the equator 12 of the joint ball 11 as a continuous spherical outer surface uninterrupted in the circumferential direction, which rests with its entire surface against the inside wall 10 of the housing 2. Moreover, the lower bearing shell 16 is formed as an annular, circumferentially closed drawn component and, like the upper bearing shell 7, has in the contact zone 26 with the joint ball 11 four lubrication grooves 15 that extend in a plane passing through the central axis 27 of the ball stud 6.

The four lubrication grooves 15 of the lower bearing shell 16 are produced without machining in a wall 28 of the lower bearing shell 16, in the manner of embossments. The lower bearing shell 16 extends with a hollow-cylindrical section 29 axially toward the upper pole 13 of the joint ball 11 beyond the equator 12 of the joint ball. During assembly, the joint ball 11 can be inserted into the lower bearing shell 16 through the hollow-cylindrical section 29. Thanks to the extension of the lower bearing shell 16 in the axial direction 9 beyond the equator 12 of the joint ball 11 in the direction toward the upper pole 13, it is possible, even when the joint ball 11 is displaced axially during driving operation, for the lower bearing shell 16 to absorb the bearing forces that act predominantly perpendicularly to the axial direction 9. If during driving operation the joint ball 11 moves clear of its bearing seat in the lower bearing shell 16 and is displaced axially toward the cover 4, the bearing forces are transmitted into the housing 2 by way of the hollow-cylindrical area 29 of the lower bearing shell 16, which is also in contact with the inside wall 10 of the housing 2. An end face 30 of the lower bearing shell facing toward the upper pole 13 of the joint ball 11 is machined and has concentric machining grooves produced by a turning process.

Figure 6:
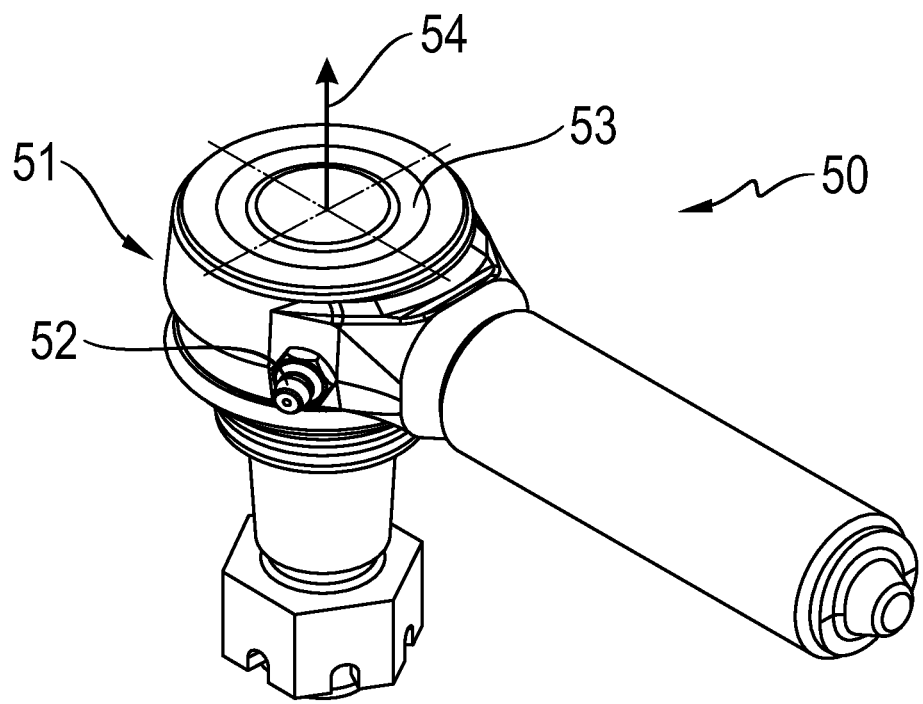
FIG. 6: Perspective representation of a radial ball joint according to a second embodiment of the invention.
Figure 7:
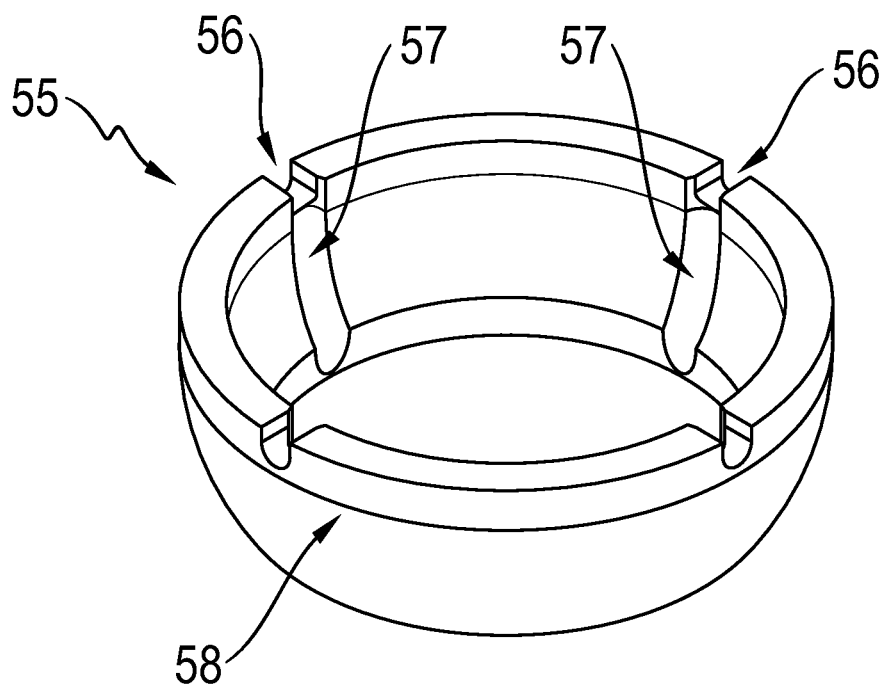
FIG. 7: Perspective view of a lower bearing shell of the radial ball joint according to the second embodiment.

FIG. 6 shows a radial ball joint 50, which differs from the radial ball joint 1 described above in respect of its housing 51, in which a lubrication nipple 52 is fitted at the side. Due to the lateral lubricant supply the radial ball joint 50 according to this second embodiment has a closed cover 53. The lower bearing shell 16 of the first embodiment cannot be used in the second embodiment, because the wall 28 of the lower bearing shell 16 described earlier would block the entry of lubricant into the housing 51. Accordingly, with the housing 51 a lower bearing shell 55 with cut-outs 56 is used in order to enable unimpeded access of the lubricant. Analogously to the lower bearing shell 16 already described, the lower bearing shell 55 also has four lubrication grooves 57 at whose ends facing toward the cover 53 the respective cut-outs 56 are arranged and extend through a wall 58 of the lower bearing shell 55 in those areas. In other respects the radial ball joint 50 according to the second embodiment is designed in the same way as the radial ball joint 1 of the first embodiment.

Figure 8:
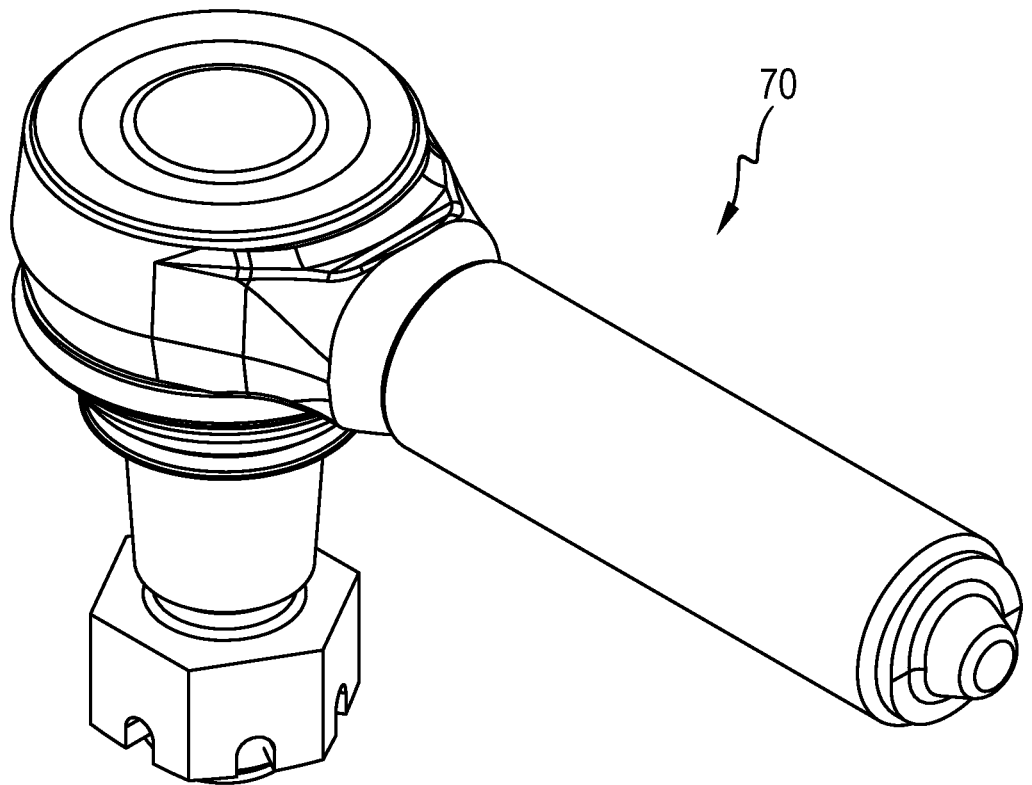
FIG. 8: Perspective view of a radial ball joint according to a third embodiment of the invention.

FIG. 8 shows a radial ball joint 70 designed to be maintenance-free, which during assembly is filled just the once with an amount of grease deemed sufficient for its expected useful life.

INDEXES

1 Radial ball joint
2 Housing
3 Shaft
4 Cover
5 Lubrication nipple
6 Ball stud
7 Upper bearing shell
8 Round sealing ring
9 Axial direction of the radial ball joint
10 Inside wall of the housing
11 Joint ball
12 Equator of the joint ball
13 Upper pole of the joint ball
14 Lubrication groove in the upper bearing shell
15 Lubrication groove in the lower bearing shell
16 Lower bearing shell
17 Sealing bellows
18 Stud
19 Outlet opening
20 Wall of the upper bearing shell
21 Contact zone with the joint ball
22 Bulge
23 End face of the upper bearing shell
24 Stop surface of the cover
25 Contact zone with the inside wall of the housing
26 Contact zone with the joint ball
27 Central axis of the ball stud
28 Wall of the lower bearing shell
29 Hollow-cylindrical section of the lower bearing shell
30 End face of the lower bearing shed
50 Radial ball joint
51 Housing
52 Lubrication nipple
53 Cover
54 Axial direction of the radial ball joint
55 Lower bearing shell
56 Cut-out in the lower bearing shell
57 Lubrication groove in the lower bearing shell
58 Wall of the lower bearing shell
70 Radial ball joint

The invention claimed is:

1. A radial ball joint for a vehicle, the radial ball joint comprising:
 a housing for holding a joint ball of a ball stud in such manner that the ball stud being rotatable and pivotable,
 an upper bearing shell, made of a steel sheet, being arranged between an inside wall of the housing and the joint ball,
 the upper bearing shell being in contact over a contact zone against the joint ball in order to provide a circumferential slide bearing for the joint ball between an equator of the joint ball and an upper pole of the joint ball,
 the upper bearing shell being in a form of an annular, circumferentially closed drawn component and having in the contact zone with the joint ball, and
 a plurality of lubrication grooves passing though a wall of the upper bearing shell in a manner of an embossment.

2. The radial ball joint according to claim 1, wherein the plurality of lubrication grooves passing through the wall of the upper bearing shell protrude as bulges on a surface region of the upper bearing shell that faces away from the contact zone with the joint ball.

3. The radial ball joint according to claim 2, wherein a round sealing ring is arranged between the upper bearing shell, the inside wall of the housing and the cover, the round sealing ring is in contact all round with each of the upper bearing shell, the inside wall of the housing and the cover, and the upper bearing shell is braced, in an axial direction, by the round sealing ring against the joint ball.

4. The radial ball joint according to claim 3, wherein the bulges act, to a large extent, to impede rotation and prevent twisting of the upper bearing shell relative to the round sealing ring.

5. The radial ball joint according to claim 1, wherein the lubrication grooves extend in a plane passing through a central axis of the ball stud.

6. The radial ball joint according to claim 1, wherein the upper bearing shell is made from case-hardened steel and its entire surface is case-hardened.

7. The radial ball joint according to claim 1, wherein an end face of the upper bearing shell, facing toward the upper pole of the joint ball, together with a corresponding stop surface of a cover that closes off the housing, on one side, form an end stop with respect to movement of the joint ball in an axial direction.

8. The radial ball joint according to claim 1, wherein the upper bearing shell is arranged radially spaced away from the inside wall of the housing.

9. The radial ball joint according to claim 1, wherein a lower bearing shell, made of a steel sheet, is arranged between the inside wall of the housing and the joint ball, the lower bearing shell is in contact with the joint ball over contact zones thereof in order to provide a circumferential slide bearing for the joint ball substantially between the equator and a stud connected to the joint ball.

10. The radial ball joint according to claim 9, wherein the lower bearing shell is in a form of an annular, circumferentially closed drawn component and has a plurality of lubrication grooves, in a contact zone with the joint ball, which extend in a plane passing through the central axis of the ball stud.

11. The radial ball joint according to claim 10, wherein the plurality of lubrication grooves are formed in the manner of an embossment in a wall of the lower bearing shell, without machining.

12. The radial ball joint according to claim 9, wherein in a contact zone with the inside wall of the housing, the lower bearing shell is in a form of a circumferentially continuous spherical outer surface, and the contact zone of the lower bearing shell is in contact with the inside wall of the housing, at least in part.

13. The radial ball joint according to claim 9, wherein the lower bearing shell extends in a direction toward the upper pole of the joint ball to beyond the equator of the joint ball.

14. The radial ball joint according to claim 1, wherein the radial ball joint has a once-through lubrication, with entry of the lubricant by way of a lubrication nipple and lubricant discharge by way of at least one outlet opening in a sealing bellows that seals the radial ball joint and extends between the housing and the ball stud.

15. The radial ball joint according to claim 14, wherein the lubrication nipple is arranged centrally in a cover, extends either in an axial direction or laterally in the housing.

16. The radial ball joint according to claim 14, wherein the lubrication nipple is arranged centrally in a cover and extends laterally with respect to the housing, and the lower bearing shell has a cut-out, in an area of at least one lubrication groove, to enable entry of the lubricant.

17. The radial ball joint according to claim 1, wherein the radial ball joint is designed to be maintenance-free.

18. A radial ball joint for a vehicle, the radial ball joint comprising:
- a ball stud having a joint ball and a stud extending from the joint ball and defining a longitudinal axis,
- the joint ball having a spherical surface with an circumferential line extending about the joint ball perpendicular to the longitudinal axis and defining a largest diameter of the joint ball,
- an upper pole of the joint ball being located on the longitudinal axis on a side of the joint ball opposite the stud;
- a housing having an inside surface, a lower end of the housing having an lower opening, the joint ball being supported by the inside surface of the housing such that the stud of the ball stud extends through the lower opening;
- an upper bearing shell being arranged within the housing, between the inside surface of the housing and the joint ball, the upper bearing shell having a wall with a contact surface and forming a first peripheral slide bearing that facilitates pivotable and rotational movement of the ball stud relative to the housing, the contact surface of the wall of the upper bearing shell mating with the spherical surface of the joint ball between the circumferential line and the upper pole of the joint ball, the upper bearing shell being made of steel sheet and formed as an annular, circumferentially closed drawn component, the wall of the upper bearing shell having a plurality of lubrication grooves embossed in the contact surface of the wall and which pass though the wall.

19. The radial ball joint according to claim 18, wherein the plurality of lubrication grooves which pass through the wall forming a plurality of bulges on an outer surface of the upper bearing shell opposite the contact surface, and the lubrication grooves and the bulges extend in planes that are aligned such that the longitudinal axis lies in the planes.

20. The radial ball joint according to claim 19, further comprising a lower bearing shell arranged between the inside surface of the housing and the joint ball, the lower bearing shell has a wall with a contact surface and forms a second peripheral slide bearing that facilitates movement of the ball stud relative to the housing, the contact surface of the wall of the lower bearing shell mates with the spherical surface of the joint ball between the circumferential line and the stud of the ball stud, an outer surface of the lower bearing shell mates with the inside surface of the housing, the lower bearing shell is made from a steel sheet and formed as an annular, circumferentially closed drawn component, and the contact surface of the lower bearing shell has a plurality of lubrication grooves which extend in planes that are aligned such that the longitudinal axis of the ball stud lies in the planes.

* * * * *